(12) United States Patent
Wu

(10) Patent No.: US 7,511,773 B2
(45) Date of Patent: Mar. 31, 2009

(54) POLARIZED LIGHT CONVERSION APPARATUS

(75) Inventor: Jingmiau Wu, Taipei (TW)

(73) Assignee: Premier Image Technology Corporation, Taipei (TW)

( * ) Notice: Subject to any disclaimer, the term of this patent is extended or adjusted under 35 U.S.C. 154(b) by 316 days.

(21) Appl. No.: 11/594,179

(22) Filed: Nov. 8, 2006

(65) Prior Publication Data

US 2008/0094706 A1  Apr. 24, 2008

(30) Foreign Application Priority Data

Oct. 5, 2006  (TW)  ............... 95137134 A

(51) Int. Cl.
| | |
|---|---|
| *G02F 1/1335* | (2006.01) |
| *G03B 21/14* | (2006.01) |
| *G03B 21/28* | (2006.01) |
| *G02B 5/30* | (2006.01) |
| *G02B 27/28* | (2006.01) |
| *G02B 6/00* | (2006.01) |
| *F21V 9/14* | (2006.01) |

(52) U.S. Cl. ............... 349/5; 349/66; 353/20; 353/98; 359/497; 362/19; 385/11

(58) Field of Classification Search ........... 349/5; 359/497; 362/19; 353/20, 84
See application file for complete search history.

(56) References Cited

U.S. PATENT DOCUMENTS

2005/0213310 A1* 9/2005 Takeda .................. 362/19

\* cited by examiner

*Primary Examiner*—Uyen Chau N Le
*Assistant Examiner*—Kajli Prince
(74) *Attorney, Agent, or Firm*—Birch, Stewart, Kolasch & Birch, LLP

(57) ABSTRACT

A polarized light conversion apparatus comprises a polarization device, a light source, a reflection device and a phase changing device. The polarization device includes a light-transmissible body and a polarization film. The light-transmissible body includes an incidence surface. The incidence surface includes a first part and a second part. The first part intersects the second part at an angle. The polarization film is disposed on the incidence surface. The light source is disposed in one side of a bisector of the angle between the first part and the second part and corresponding to the incidence surface. The reflection device includes a reflection surface. The reflection surface is disposed corresponding to the incidence surface and in the other side of the bisector of the angle. The reflection surface is perpendicular to the bisector of the angle. The phase changing device is disposed between the polarization device and the reflection device.

20 Claims, 13 Drawing Sheets

(Relevant Art)

POLARIZED LIGHT CONVERSION APPARATUS

BACKGROUND OF THE INVENTION

1. Field of the Invention

The present invention relates generally to a polarized light conversion apparatus and a light source device applying the polarized light conversion apparatus. Particularly, the present invention relates to a polarized light conversion apparatus to convert non-polarized light into specific linear light.

2. Description of the Prior Art

Light source devices are widely used in electronic devices such as computers, televisions, projectors and cellular phones. The brightness is a key factor of the performance of the light source device, while the brightness is highly relative to the light efficiency.

With reference to FIG. 1a, the conventional structure of a LCD displayer includes a light source 300, a LCD panel 40 and two polarization parts 10. The two polarization parts 10 are respectively disposed in front of and behind the LCD panel 40. The light source 300, including light emitting diode, emits non-polarizied light 310. The non-polarized light 310 travels firstly to the polarization part 10 in the light source 300 side of the LCD panel 40. About half amount of the specific linear polarized light 330 passes through the polarization part 10, while the other half amount is absorbed or reflected by the polarization part 10. The passed specific linear polarized light 330 further passes through the LCD panel 40 and the polarization part 10 in the other side of the LCD panel 40 to form images. The light efficiency is reduced since only about half amount of the specific linear polarized light 330 can be used in the displayer. LED is used as the light source of the LCD displayer because of its small volume and low power consumption. However, as mentioned above, the light emitted by the light source including LED is non-polarized light, and only about half amount of the light can be used in the displayer. Therefore the light efficiency is reduced and needs to be improved.

SUMMARY OF THE INVENTION

It is an object of the present invention to provide a polarized light conversion apparatus and a light source device applying the polarized light conversion apparatus to convert non-polarized light into specific linear polarized light. It is another object of the present invention to provide a polarized light conversion apparatus and a light source device applying the polarized light conversion apparatus to improve the light efficiency. It is a further object of the present invention to provide a polarized light conversion apparatus and a light source device applying the polarized light conversion apparatus to reduce the shoot angle of the emitted light.

The polarized light conversion apparatus of the present invention comprises a polarization device, a light source, a reflection device and a phase changing device. The polarization device includes a light-transmissible body and a polarization film. The light-transmissible body includes an incidence surface, wherein the polarization film is disposed on the incidence surface. The incidence surface includes a first part and a second part, wherein the first part intersects the second part at an angle. The angle between the first part and the second part is 90 degrees.

The light-transmissible body includes two light-transmissible plates. The light-transmissible body includes a light-transmissible pyramid. The light-transmissible body includes a light-transmissible cone.

The light source is disposed in one side of a bisector of the angle between the first part and the second part and corresponding to the incidence surface. The light source emits non-polarized light. The phase changing device converts a first polarized light to a second polarized light after the first polarized light passes through the phase changing device twice. The polarized light conversion apparatus further comprises a light refraction device, wherein the light refraction device is disposed between the light source and the polarization device. The light refraction device refracts the non-polarized light to travel in the direction parallel with the bisector of the angle. The light refraction device includes a lens.

The reflection device includes a reflection surface, wherein the reflection surface is light reflectable. The reflection surface is disposed corresponding to the incidence surface and in the other side of the bisector of the angle corresponding to the light source. The reflection surface is perpendicular to the bisector of the angle. The phase changing device is disposed between the d polarization device and the reflection device.

BRIEF DESCRIPTION OF THE DRAWINGS

FIG. 5b is a perspective view of another preferred embodiment showing the light-transmissible body includes two light-transmissible plates.

DETAILED DESCRIPTION OF THE PREFERRED EMBODIMENT

Figure 1A:
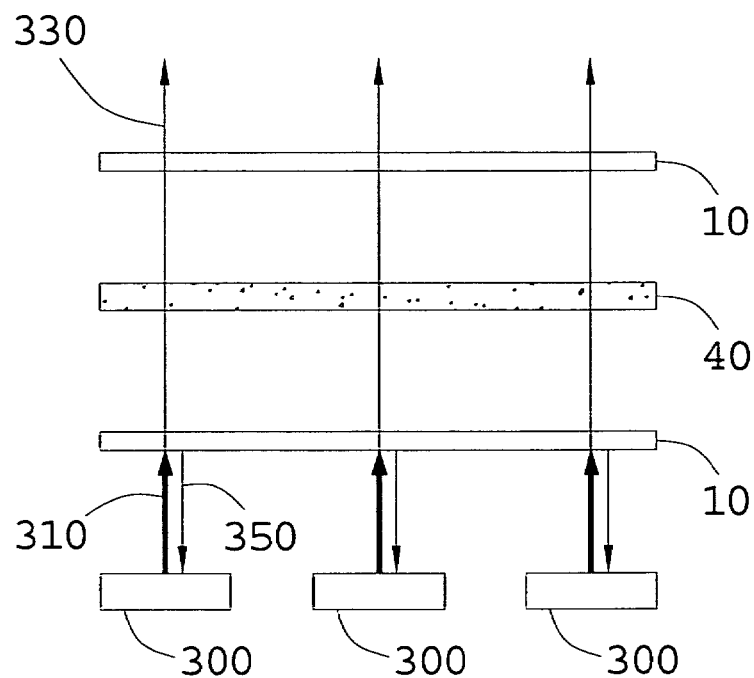
FIG. 1a is a perspective view of a LCD displayer applying a light source of a prior art.
Figure 1B:
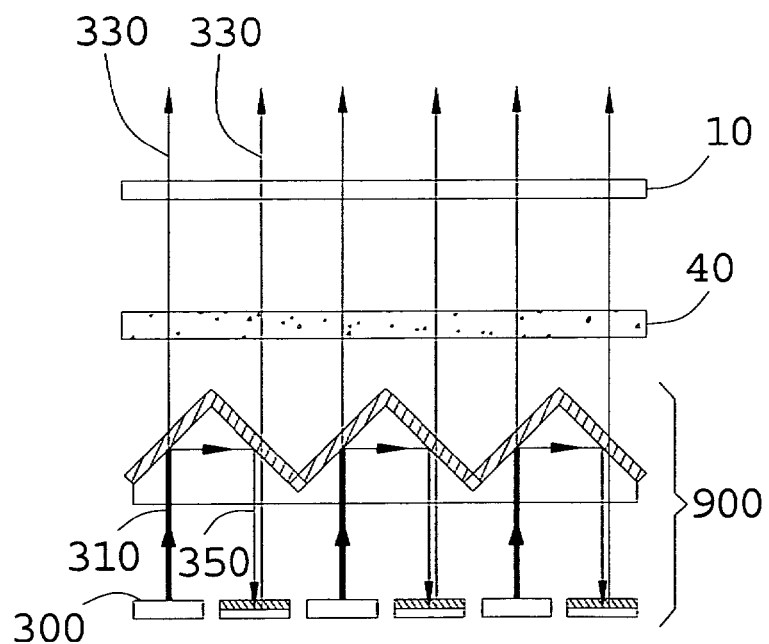
FIG. 1b is a perspective view of a LCD displayer applying the polarized light conversion apparatus of the present invention.
Figure 2A:
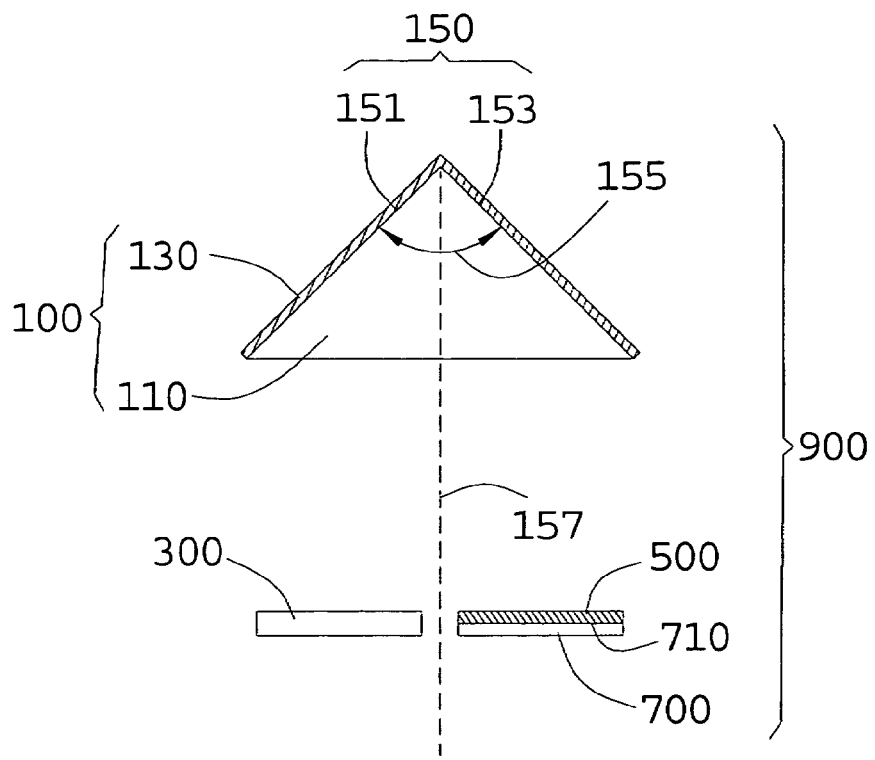
FIG. 2a is a perspective view of a preferred embodiment.
Figure 2B:
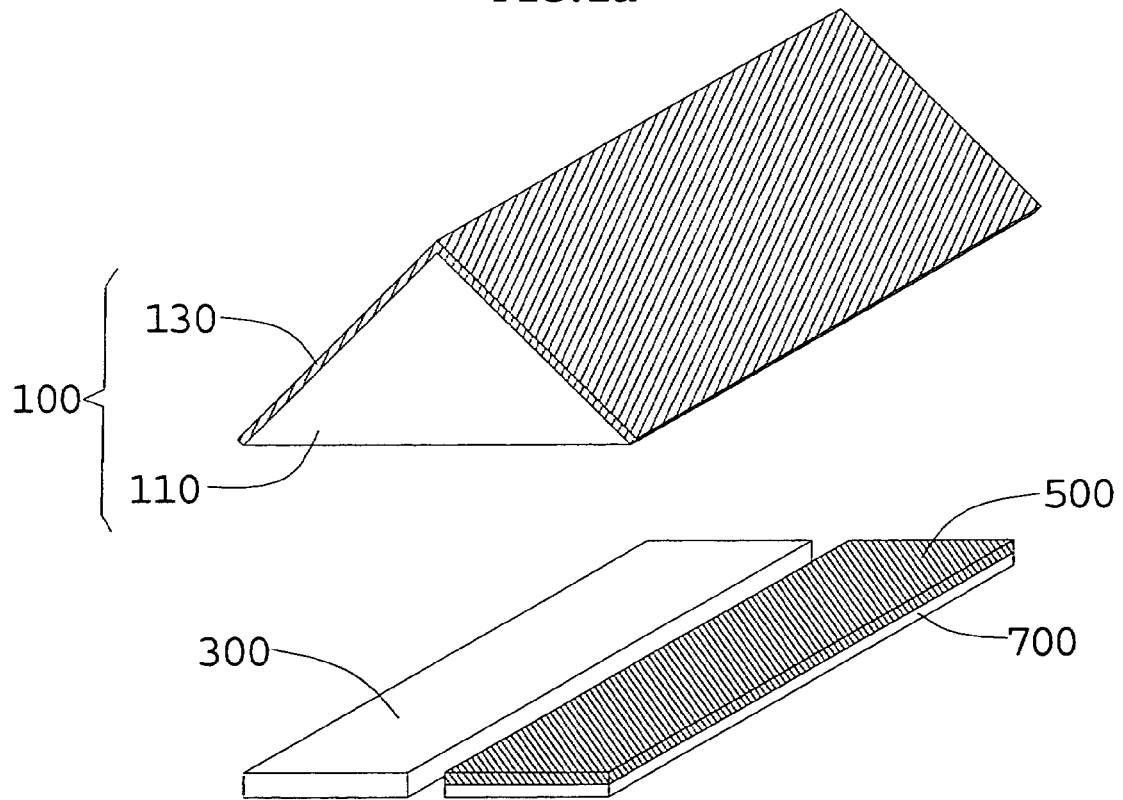
FIG. 2b is a perspective view of a preferred embodiment.

The present invention provides a polarized light conversion apparatus for converting non-polarized light into specific linear polarized light. With reference to FIG. 1b, the light efficiency is promoted by converting the non-polarized light 310 emitted by the light source 300 into the specific linear light 330 by the polarized light conversion apparatus of the present invention. With reference to FIG. 2a, in a preferred embodiment, the polarized light conversion apparatus 900 of the present invention comprises a polarization device 100, a light source 300, a reflection device 700 and a phase changing device 500. The polarization device 100 includes a light-transmissible body 110 and a polarization film 130. The light-transmissible body 110 includes an incidence surface 150, wherein the polarization film 130 is disposed on the incidence surface 150. The incidence surface 150 includes a first part 151 and a second part 152, wherein the first part 151 intersects the second part 152 at an angle 155. The angle 155 is 90 degrees. The light source 300 is disposed in one side of the bisector 157 of the angle 155. FIG. 2b shows the perspective diagram of the preferred embodiment. With reference to FIG. 2b, the light-transmissible body 110 is a triangular prism, wherein the first part 151 and the second part 153 are respectively two sides of the triangular prism.

Figure 2C:
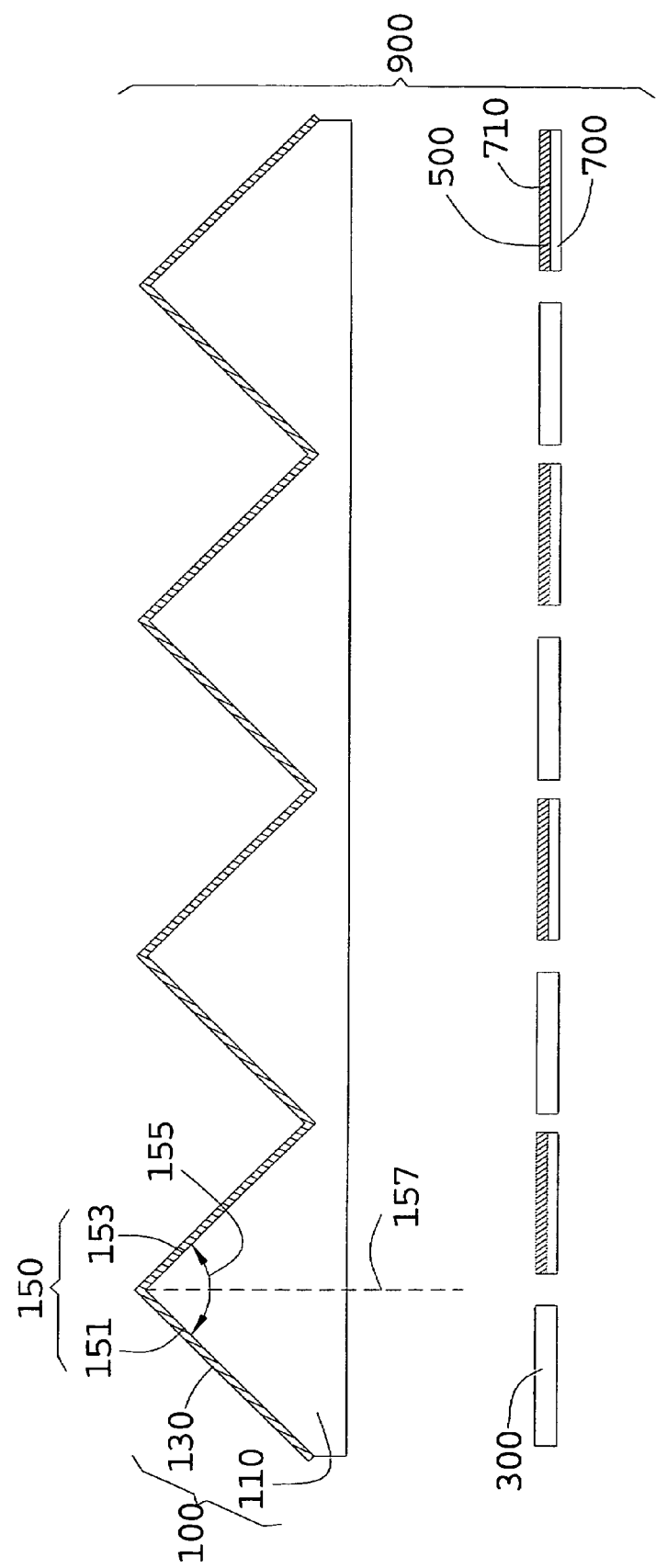
FIG. 2c is a perspective view of a preferred embodiment showing the light-transmissible body has a connective plural structure.

The light-transmissible body 110 may has a plural structure. With reference to FIG. 2c, in another preferred embodiment, the light-transmissible body 110 has a connective plural structure to increase the usage of light source 300. The light emitting area is therefore increased by the increase usage of light source 300. In a preferred embodiment, the polarization film 130 is coated on the incidence surface 150 of the light-transmissible body 100. The manufacturing cost is lowered by coating more light-transmissible bodies 110 once when the light-transmissible body 110 has a connective plural structure to increase the usage of light source 300 to increase the light emitting area.

The reflection device 700 includes a reflection surface 710, wherein the reflection surface 710 is light reflectable. In a preferred embodiment, the reflection surface 710 is a metal coating plate. In another embodiment, the reflection surface 710 may be a metal object having a light reflectable surface or a nonmetal object having a metal coating surface. The reflection surface 710 is disposed corresponding to the incidence surface 150 and in the other side of the bisector 157 of the angle 155. The reflection surface 710 is perpendicular to the bisector 157 of the angle 155. The phase changing device 500 is disposed between the polarization device 100 and the reflection device 700. In a preferred embodiment, the light-transmissible body 110 is a light-transmissible acrylic body, wherein the polarization film 130 is coated on the light-transmissible body 110. In another embodiment, the light-transmissible body 110 may be made of light-transmissible glass or light-transmissible polymer.

Figure 3:
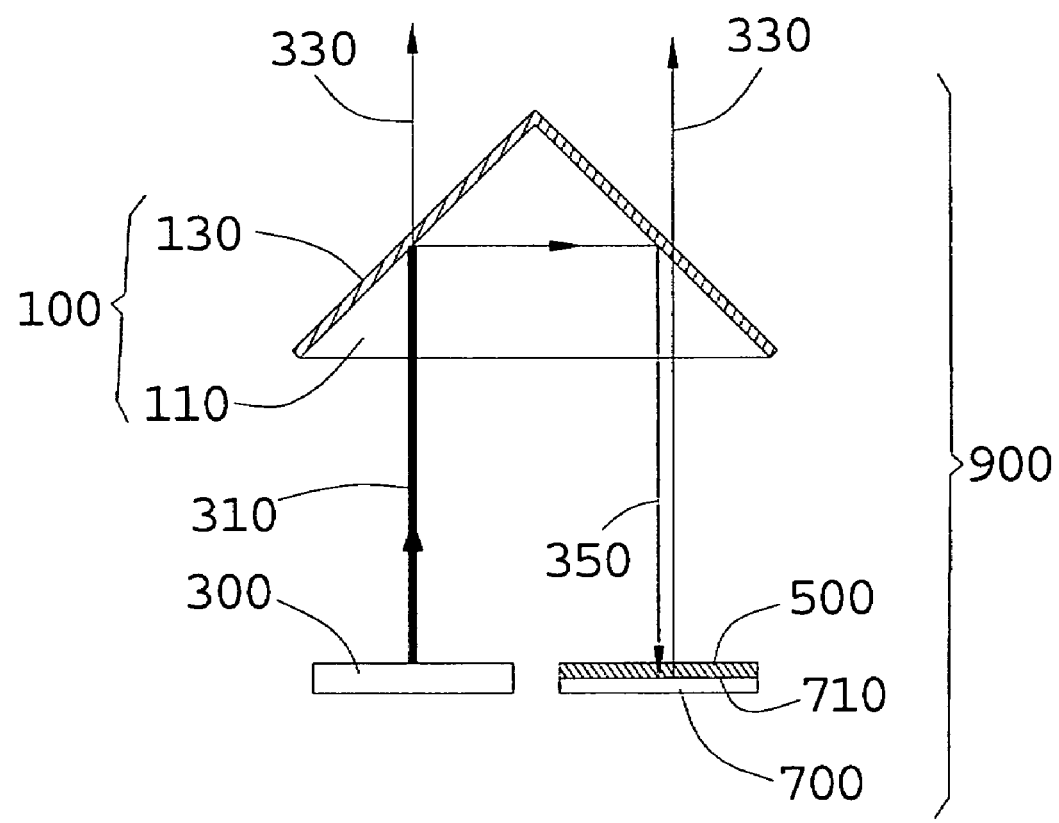
FIG. 3 is a perspective view of a preferred embodiment showing the traveling of the light.

With reference to FIG. 3, in a preferred embodiment, the polarization film 130 lets specific polarized light 330 of non-polarized light 310 pass through and reflects another specific polarized light 350 of the non-polarized light 310. The phase changing device 500 includes a quarter wave plate. The phase changing device 500 rotates the polarization state of linear polarized light 90 degrees after the linear polarized light passes through the phase changing device 500 twice. For example, S wave polarized light is converted into P wave polarized light after passes through the phase changing device 500 twice. P wave polarized light is converted into S wave polarized light after passes through the phase changing device 500 twice.

With reference to FIG. 3, in a preferred embodiment, the specific polarized light 330 of the non-polarized light 310 emitted by the light source 300 passes through the polarization film 130. The other specific polarized light 350 travels to the phase changing device 500 after being reflected by the polarization film 130. The specific polarized light 350 firstly passes through the phase changing device 500 once. After being reflected by the reflection device 700, the specific polarized light 350 passes through the phase changing device 500 once again. Thus the specific polarized light 350 totally passes through the phase changing device 500 twice and is converted into the specific polarized light 330 to pass the polarization film 130. Accordingly, the polarized light conversion apparatus 900 of the present invention converts the non-polarized light 310 into the specific polarized light 330.

Figure 4:
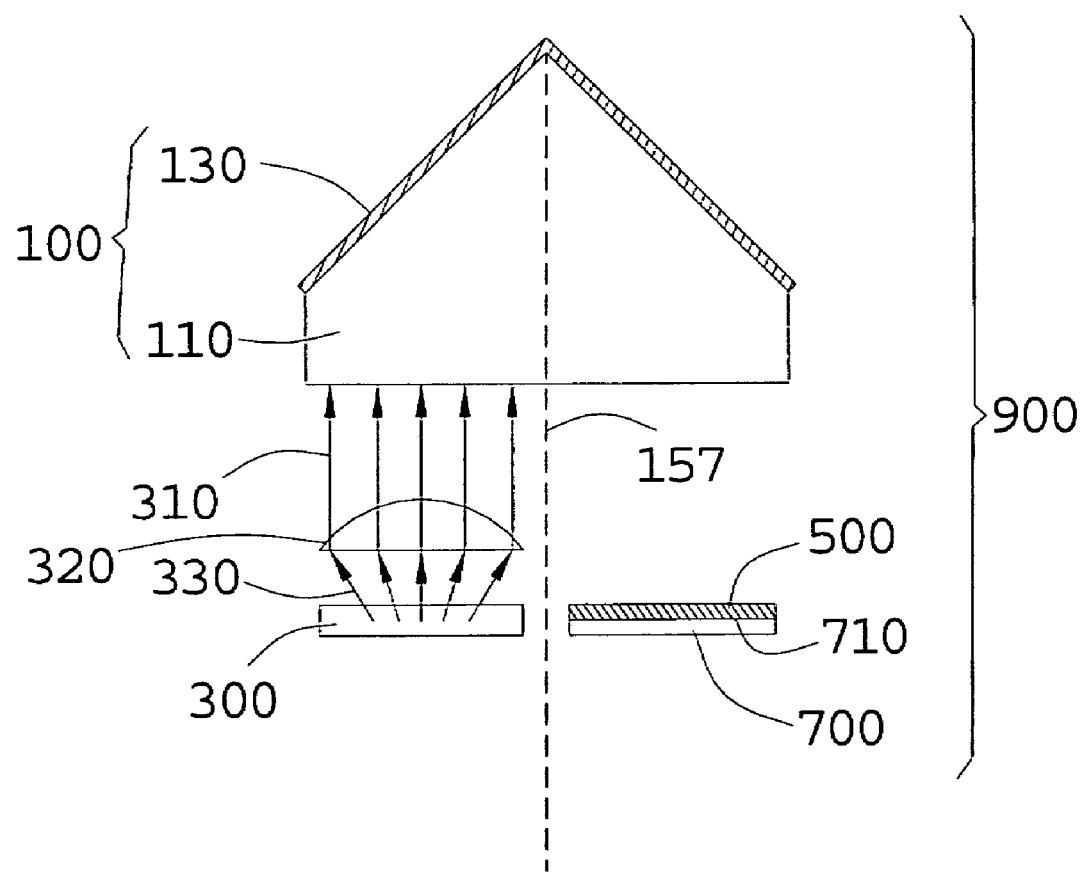
FIG. 4 is a perspective view of a preferred embodiment comprising a light refraction device.

With reference to FIG. 4, in a preferred embodiment, the polarized light conversion apparatus 900 further comprising a light refraction device 330. The light refraction device 330 is disposed between the light source 300 and the polarization device 100. The light refraction device 330 refracts the non-polarized light 310 to travel in the direction parallel with the bisector 157. Accordingly, the shoot angle of the emitted light is reduced. In a preferred embodiment, the light refraction device 330 includes a lens.

Figure 5A:
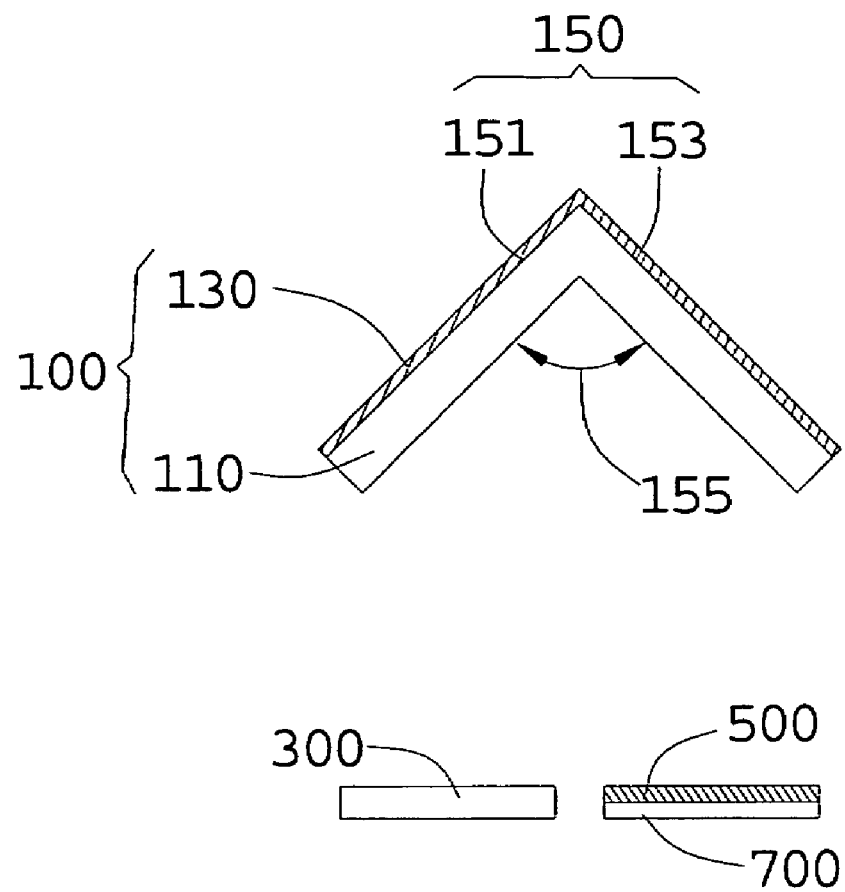
FIG. 5a is a perspective view of a preferred embodiment showing the light-transmissible body includes two light-transmissible plates.
Figure 5B:
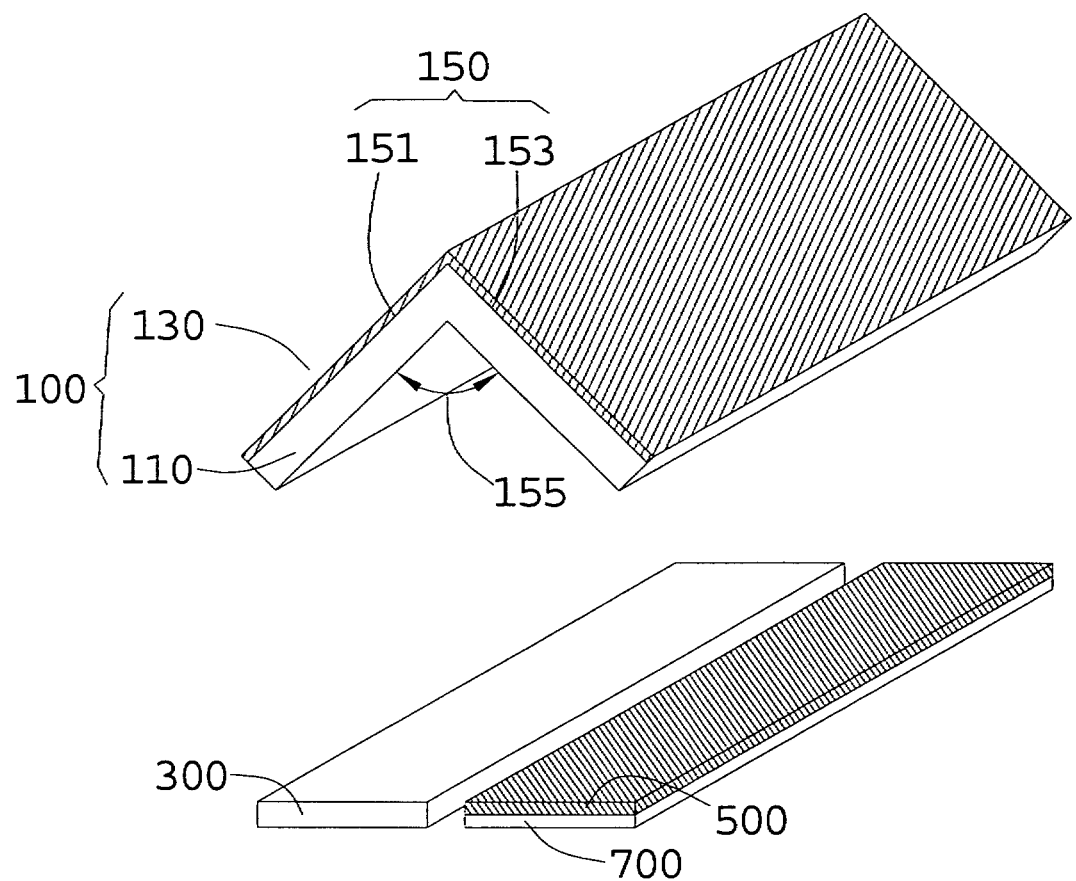
FIG. 5b is a perspective view of a preferred embodiment showing the light-transmissible body includes two light-transmissible plates.
Figure 5C:
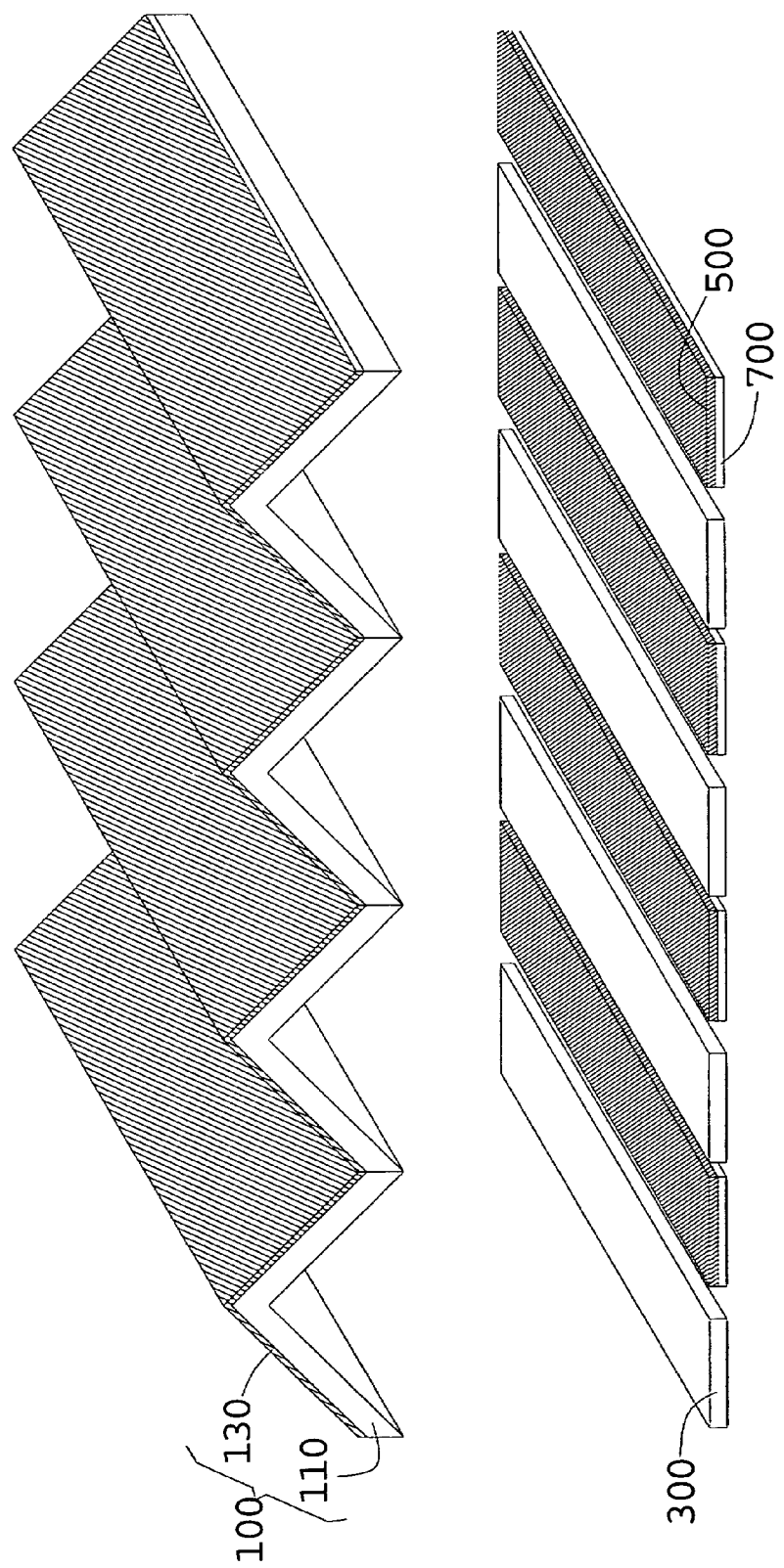
FIG. 5c is a perspective view of a preferred embodiment showing the light-transmissible body has a corrugated plate structure.

The light-transmissible body 110 may has different structures. With reference to FIG. 5a, in another preferred embodiment, the light-transmissible body 110 includes two light-transmissible plates. The two light-transmissible plates are the first part 151 and the second part 153 respectively. The first part 151 and the second part 153 together form the incidence surface 150, wherein the incidence surface 150 contains the angle 155 and the angle 155 is 90 degrees. FIG. 5b shows the perspective diagram of the preferred embodiment. As mentioned above, the light-transmissible body 110 may has a plural structure. With reference to FIG. 5c, in another preferred embodiment, plural of the light-transmissible bodies 110 together form a corrugated plate structure.

Figure 5D:
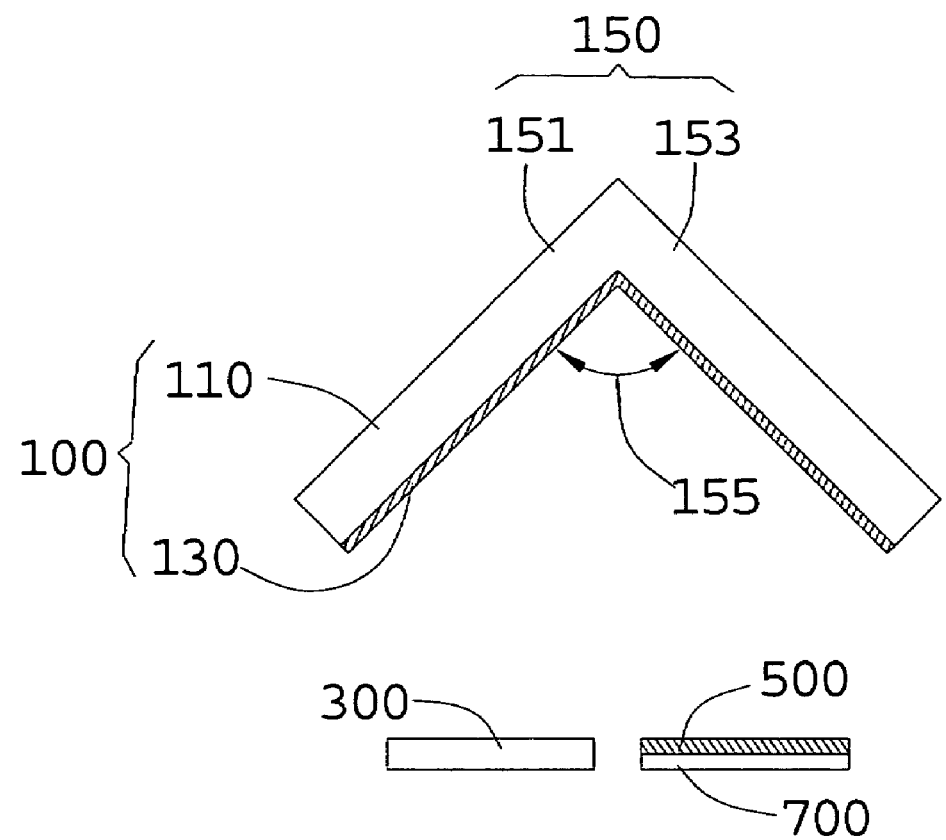

The polarization film 130 is disposed on the incidence surface 150. With reference to FIG. 5a, in a preferred embodiment, the polarization film 130 is disposed on the opposite side of the incidence surface 150 corresponding to the light source 300 and the phase changing device 500. It means the polarization film 130 is disposed on the incidence surface 150 and is in the opposite side to the light source 300 and the phase changing device 500 corresponding to the light-transmissible body 110. With reference to FIG. 5d, in another preferred embodiment, the polarization film 130 is disposed on the same side of the incidence surface 150 corresponding to the light source 300 and the phase changing device 500. It means the polarization film 130 is disposed on the incidence surface 150 and is in the same side to the light source 300 and the phase changing device 500 corresponding to the light-transmissible body 110.

Figure 6A:
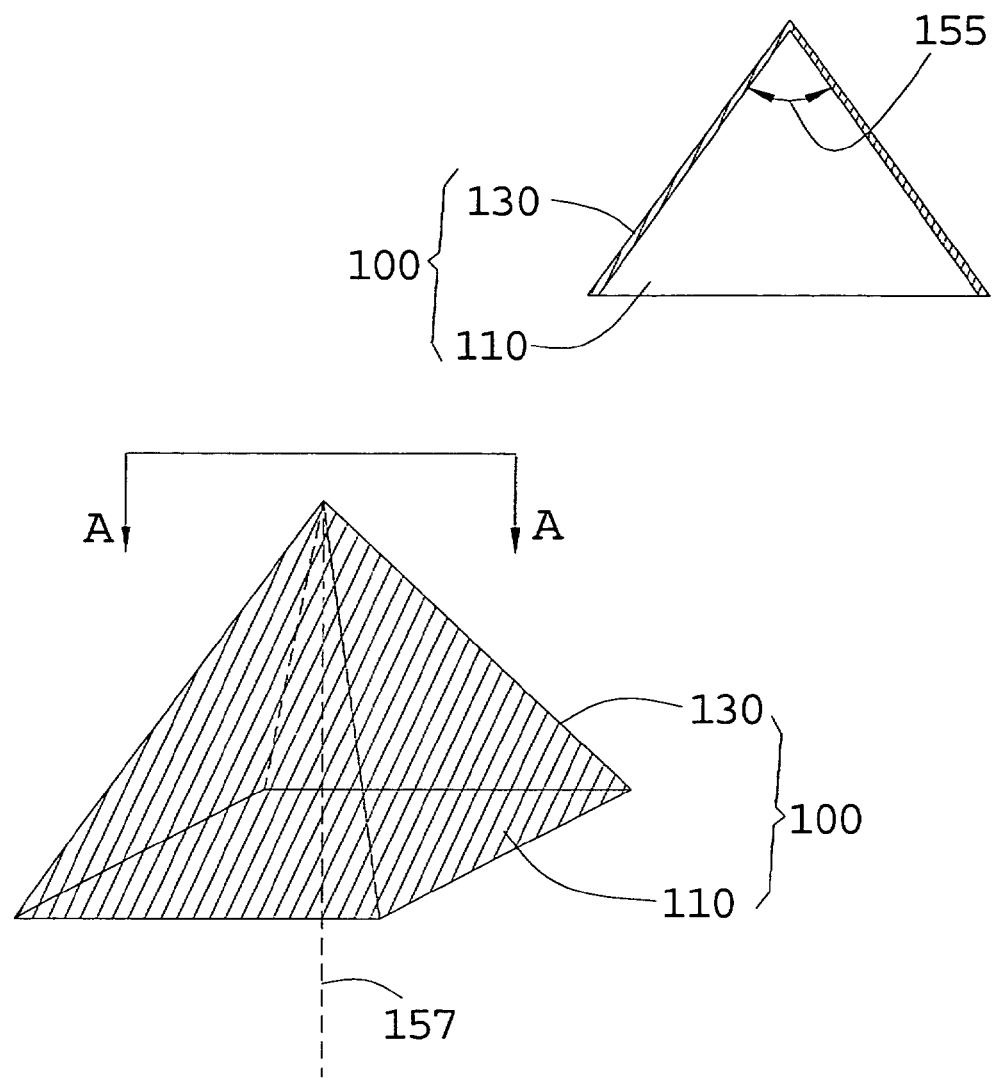
FIG. 6a is a perspective view of a preferred embodiment showing the light-transmissible body includes a pyramid.
Figure 6B:
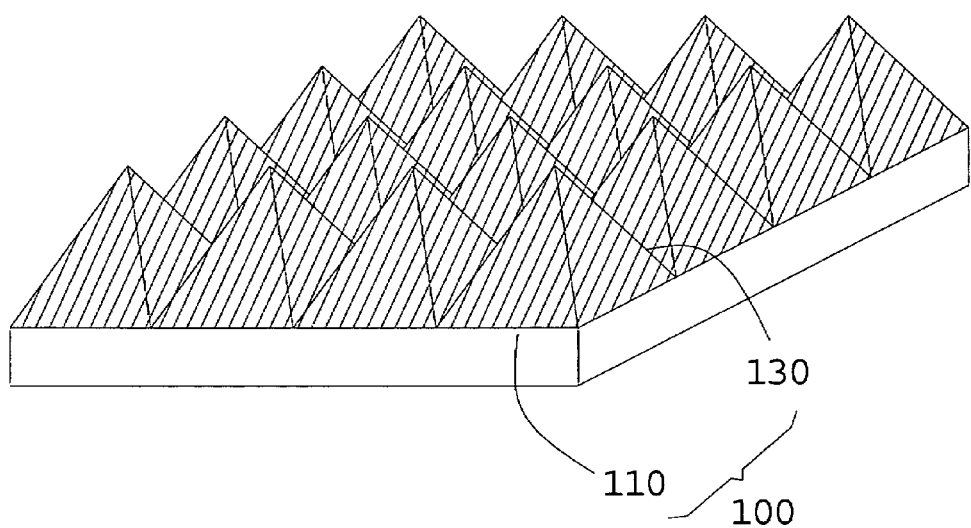
FIG. 6b is a perspective view of a preferred embodiment showing the light-transmissible body has a plural pyramid structure

With reference to FIG. 6a, in a preferred embodiment, the light-transmissible body 110 includes a light-transmissible pyramid. The light-transmissible pyramid contains a 90 degrees perpendicular angle. With reference to the cutaway AA of FIG. 6a, the angle 155 is the perpendicular angle of the light-transmissible pyramid and the light-transmissible body 110 is a light-transmissible pyramid, wherein the light-transmissible pyramid contains a 90 degrees perpendicular angle. The light source 300 may has different shapes corresponding to the light-transmissible body 110. The shape of the phase changing device 500 and the reflection device 700 are corresponding to the shape of light source 300. The base of the light-transmissible pyramid is not necessary four and may be any dual number larger than two. As mentioned above, the light-transmissible body 110 may has a plural structure. With reference to FIG. 6b, plural of the light-transmissible bodies 110 together form a pyramid array structure.

Figure 6C:
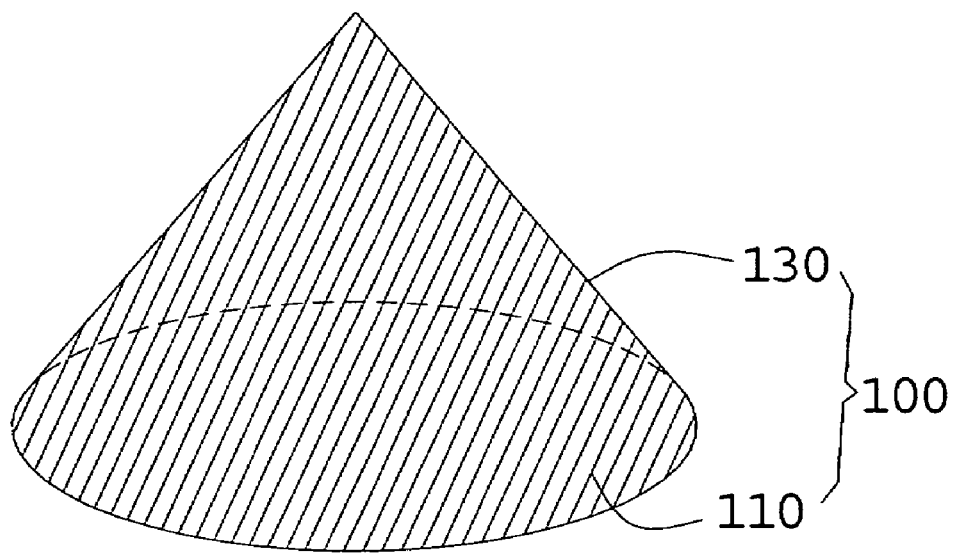
FIG. 6c is a perspective view of a preferred embodiment showing the light-transmissible body includes a cone.
Figure 6D:
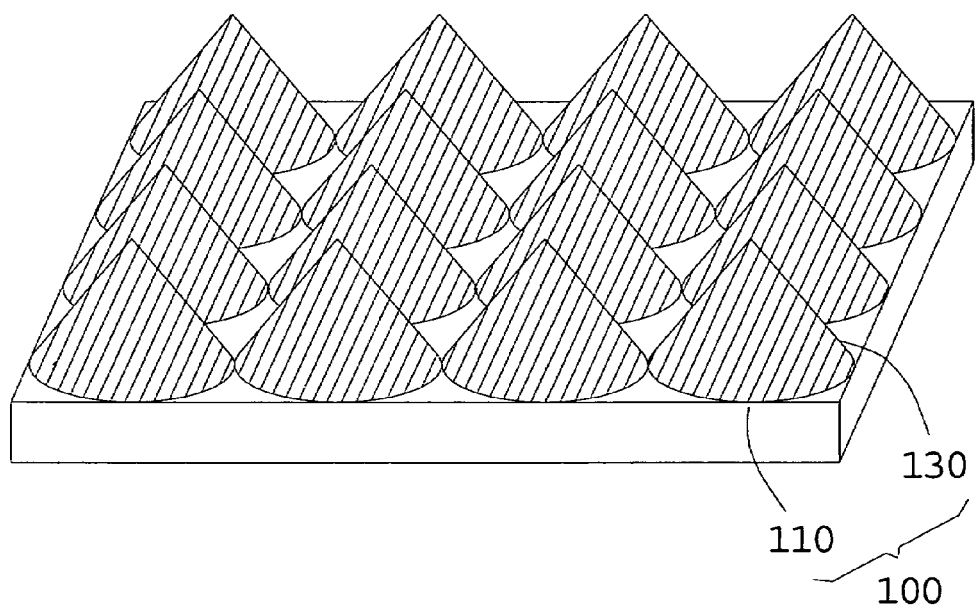
FIG. 6d is a perspective view of a preferred embodiment showing the light-transmissible body has a plural cone structure

With reference to FIG. 6c, in another preferred embodiment, the light-transmissible body 110 includes a light-transmissible cone. The light-transmissible cone contains a 90 degrees perpendicular angle. As mentioned above, the light-transmissible body 110 may has a plural structure. With reference to FIG. 6d, plural of the light-transmissible bodies 110 together form a cone array structure.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A polarized light conversion apparatus comprising:
   a polarization device including:
   a light-transmissible body including an incidence surface, wherein said incidence surface includes a first part and a second part, said first part intersects said second part at an angle; and
   a polarization film being disposed on said incidence surface;
   a light source being disposed in one side of a bisector of said angle between said first part and said second part and corresponding to said incidence surface;
   a reflection device including a reflection surface, wherein said reflection surface is disposed corresponding to said incidence surface and in the other side of the bisector of said angle, said reflection surface is perpendicular to the bisector of said angle; and
   a phase changing device being disposed between said polarization device and said reflection device.

2. The polarized light conversion apparatus of claim 1, wherein said light source emits a non-polarized light.

3. The polarized light conversion apparatus of claim 1, wherein said phase changing device converts a first polarized light to a second polarized light after said first polarized light passes through said phase changing device twice.

4. The polarized light conversion apparatus of claim 1, wherein said light-transmissible body includes two light-transmissible plates, said two light-transmissible plates together form said incidence surface.

5. The polarized light conversion apparatus of claim 1, wherein said light-transmissible body includes at least one of a light-transmissible pyramid and a light-transmissible cone.

6. The polarized light conversion apparatus of claim 1, further comprising a light refraction device being disposed between said light source and said polarization device, wherein said light refraction device refracts said non-polarized light to travel in the direction parallel with the bisector of said angle.

7. A lighting device comprising:
   a polarization device including:
   a light-transmissible body including an incidence surface, wherein said incidence surface includes a first part and a second part, said first part intersects said second part at an angle; and
   a polarization film being disposed on said incidence surface;
   a light source being disposed in one side of a bisector of said angle between said first part and said second part and corresponding to said incidence surface;
   a reflection device including a reflection surface, wherein said reflection surface is disposed corresponding to said incidence surface and in the other side of the bisector of said angle, said reflection surface is perpendicular to the bisector of said angle; and
   a phase changing device being disposed between said polarization device and said reflection device.

8. The lighting device of claim 7, wherein said light source emits a non-polarized light.

9. The lighting device of claim 7, wherein said phase changing device converts a first polarized light to a second polarized light after said first polarized light passes through said phase changing device twice.

10. The lighting device of claim 7, wherein said angle between said first part and said second part is 90 degrees.

11. The lighting device of claim 7, wherein said light-transmissible body includes two light-transmissible plates, said two light-transmissible plates together form said incidence surface.

12. The lighting device of claim 7, wherein said light-transmissible body includes at least one of a light-transmissible pyramid and a light-transmissible cone.

13. The lighting device of claim 7, further comprising a light refraction device being disposed between said light source and said polarization device, wherein said light refraction device refracts said non-polarized light to travel in the direction parallel with the bisector of said angle.

14. A projector including a lighting device, said lighting device comprising:
    a polarization device including:
    a light-transmissible body including an incidence surface, wherein said incidence surface includes a first part and a second part, said first part intersects said second part at an angle; and
    a polarization film being disposed on said incidence surface;
    a light source being disposed in one side of a bisector of said angle between said first part and said second part and corresponding to said incidence surface;
    a reflection device including a reflection surface, wherein said reflection surface is disposed corresponding to said incidence surface and in the other side of the bisector of said angle, said reflection surface is perpendicular to the bisector of said angle; and
    a phase changing device being disposed between said polarization device and said reflection device.

15. The projector of claim 14, wherein said light source emits a non-polarized light.

16. The projector of claim 14, wherein said phase changing device converts a first polarized light to a second polarized light after said first polarized light passes through said phase changing device twice.

17. The projector of claim 14, wherein said angle between said first part and said second part is 90 degrees.

18. The projector of claim 14, wherein said light-transmissible body includes two light-transmissible plates, said two light-transmissible plates together form said incidence surface.

19. The projector of claim 14, wherein said light-transmissible body includes at least one of a light-transmissible pyramid and a light-transmissible cone.

20. The projector of claim 14, further comprising a light refraction device being disposed between said light source and said polarization device, wherein said light refraction device refracts said non-polarized light to travel in the direction parallel with the bisector of said angle.

* * * * *